April 16, 1963   M. BÖRNER   3,086,182
MECHANICAL FREQUENCY FILTERS
Filed Oct. 31, 1957   2 Sheets-Sheet 1

Inventor:
Manfred Börner
By *(signature)*
Patent Agent

April 16, 1963  M. BÖRNER  3,086,182
MECHANICAL FREQUENCY FILTERS
Filed Oct. 31, 1957  2 Sheets-Sheet 2

Inventor:
Manfred Börner
By ⟨signature⟩
Patent Agent

United States Patent Office
3,086,182
Patented Apr. 16, 1963

3,086,182
MECHANICAL FREQUENCY FILTERS
Manfred Börner, Ulm (Danube), Germany, assignor to Telefunken G.m.b.H., Berlin, Germany
Filed Oct. 31, 1957, Ser. No. 693,681
Claims priority, application Germany Nov. 2, 1956
7 Claims. (Cl. 333—71)

The invention relates to a mechanical frequency filter comprising several resonant bodies mechanically coupled with each other. Such filters which, for example, can be employed in high frequency techniques as carrier frequency filters or band-pass filters, have been known per se in different forms (see: RCA—Review, 1949, pages 348–365). The known filters of this kind which heretofore have been commercially used operate either with longitudinal oscillations of individual cylindrical resonant bodies connected to each other via coupling elements in the form of wires of smaller cross section, or they operate with torsional oscillations of resonant bodies coupled in the same way. In both cases, the resonant bodies and the coupling elements are to be considered as mechanically resonant lines. In such a system, the lines serving as resonant bodies generally have a length of λ/2 of the mean frequency of the pass-band for the mode of excitation employing torsional waves or longitudinal waves. In most instances, resonant line sections of a length λ/4 are used as matching or coupling elements. In known filters of this kind, the resonant lines and their interconnecting conductors are arranged coaxially of one-another. In case of longitudinally oscillating resonant lines, the coupling elements are also longitudinally oscillated, while with torsional oscillations of the resonant lines, the coupling elements carry out torsional oscillations. Thus, with band-pass filters having a greater number of oscillating elements, comparatively long structures are obtained which can be constructed only with difficulty and are rather bulky.

It is an object of this invention to obviate these disadvantages by providing resonant bodies excited in torsional modes of oscillation, these bodies being arranged adjacent one another with their longitudinal axes parallel, and mutually coupled with each other by means of one or more longitudinally oscillating coupling members. In this way, it is possible to obtain much smaller dimensions for the filters.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

Figure 1:
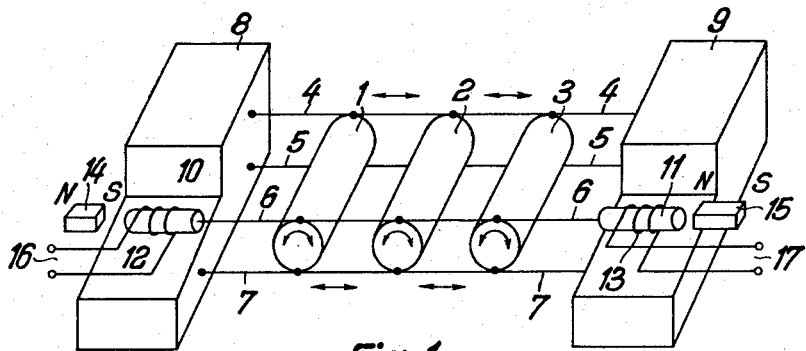
FIG. 1 is an illustrative diagram of a filter including the suspension on coupling wires of three oscillating bodies, and showing means for coupling electrical waves to the filter.

FIG. 1 illustrates a filter comprising three cylindrical torsional bodies 1, 2 and 3, on which the directions of oscillation are indicated by means of the curved arrows. In the case of an λ/2 filter, there is a torsional node in the longitudinal center of each cylinder, while the two ends carry out rotational oscillations in opposite directions with respect to the center. Such bodies can obviously be excited by higher harmonics, whereby several nodes are obtained in the intermediate portions of the bodies while carrying out torsional oscillations in opposing directions.

Four uninterrupted wires, 4, 5, 6 and 7 suspended between two stationary blocks 8 and 9 are provided to couple the individual oscillating bodies 1, 2, 3, these wires being attached at the ends of the cylindrical bodies, i.e. the wires are soldered or welded to the bodies, or are firmly secured thereto in any suitable manner. The exciting oscillating waves run longitudinally along the coupling wires as indicated by the straight arrows. At each instant, the direction of motion in adjacent wires is opposite. Thus, for example, the motion in the wires 4 and 5 takes place in opposite directions and also oppositely to the directions in the wires 6 and 7, respectively. According to the invention a single coupling wire may be used for coupling the individual oscillations. The additional wires in the embodiment shown in FIG. 1, serve merely as suspending means so that the oscillating bodies together with the wires form a mechanically stable structure. With other kinds of supporting means, the coupling may be introduced via two wires 4 and 6 or via single wire 6.

Mounting blocks 8 and 9 to which the wires 4, 5 and 7 are fixed or welded are of such size that the joints serve as short circuits for the mechanical wave motions of the wires resulting in as complete a reflection as possible. According to the embodiment shown in FIG. 1, electromechanical transducers are provided for coupling the filter line to electrical input or output circuits, said transducers consisting, for example, of ferrite oscillators 10 or 11 equipped with coupling coils 12 or 13, respectively. The ferrite cores are pre-magnetized by means of permanent magnets 14 and 15, respectively, so that the core 10 is displaced by the electrical oscillations supplied via the terminals 16. The output oscillations are taken off from the terminals 17.

Figure 2:
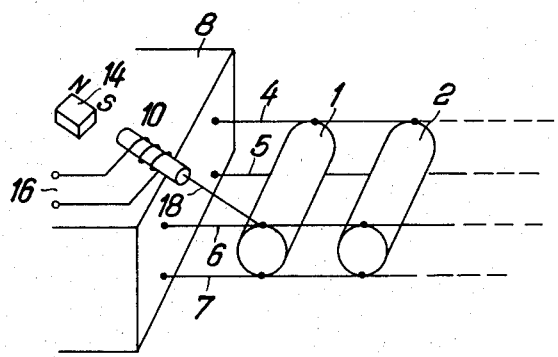
FIG. 2 is a partial diagram of a filter similar to that shown in FIG. 1, but wherein a modified coupling means is employed.

FIG. 2 shows another example for the coupling of the filters to an electrical circuit. In this embodiment all the wires 4, 5, 6 and 7 are fixed or welded to the block 8 and the excitation is coupled from the ferrite oscillator 10 via a special coupling wire 18 which is secured or welded to the resonant body 1 at the junction of wire 6. The output coupling at the other end of the filter can be obtained in the same way and, therefore, its illustration is omitted from FIG. 2.

Figure 3:
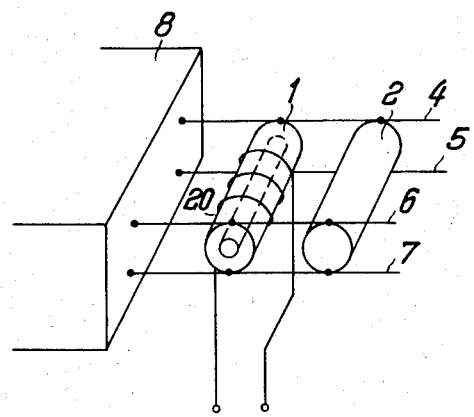
FIG. 3 is a partial diagram of a further modified coupling means for a filter.

According to a further embodiment of the invention shown in FIG. 3, the first resonant body 1 is in the form of a hollow cylindrical ferrite body which is premagnetized along its circumference. Such a pre-magnetized ferrite body is excited to execute torsional oscillations by means of a coil 20. The output coupling at the other end of the filter can be obtained in the same manner and therefore, is not illustrated.

The described principles of the excitation of mechanical filters by means of electro-mechanical transducers are known per se, so that their operational functions need not be explained. Depending upon the circumstances, different kinds of electro-magnetic transducers which operate according to other principles may be used for input and output coupling.

Figure 5:
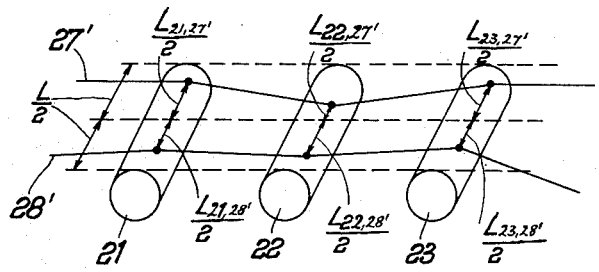
FIG. 5 is a partial diagram of a filter in which a different suspension of the bodies is employed.
Figure 6:
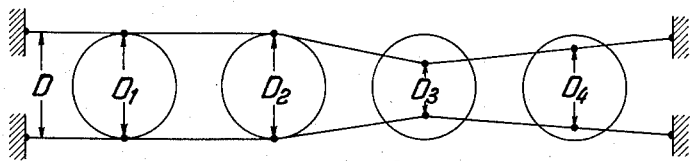
FIG. 6 is a diagram showing end views of the bodies and showing a modified suspension thereof whereby different coefficients of coupling are obtained between the oscillating bodies.

In the embodiments described in the foregoing, the coupling coefficient between each two torsional oscillating bodies within the filter is the same, provided identical bodies are employed. Different coupling coefficients can be obtained according to a further development of this invention by connecting the coupling wires either to the peripheral surfaces at different distances from the oscillation body centers, as shown in FIGS. 4 and 5, rather than only to the ends of the oscillating bodies, or else to the end surfaces of the cylindrical bodies and spaced at different distances from the torsional axes, as schematically illustrated in FIG. 6.

Figure 4:
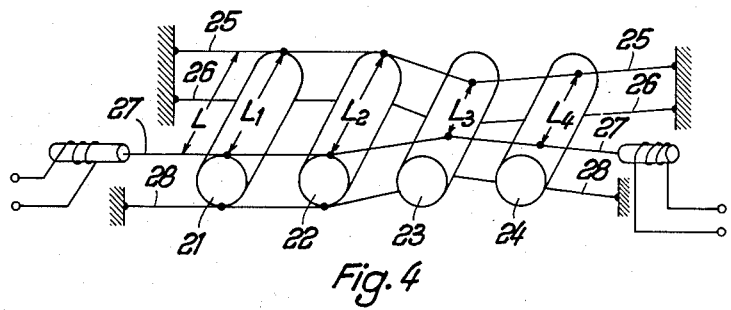
FIG. 4 is a diagram of a still further modified filter wherein different coefficients of coupling are employed between the respective oscillating bodies.

FIG. 4 shows a 4-body coupling filter in which the cylindrical oscillating bodies 21, 22, 23 and 24 are excited to torsional modes of oscillation and the coupling is obtained by means of a suspension using 4 wires 25, 26, 27 and 28. Maximum coupling is between the bodies 21 and 22, while the coupling between the bodies 22 and 23 or 23 and 24 is smaller since the wires are not welded to the outer peripheries of the oscillating bodies, but rather are fixed to the peripheral surfaces at points located closer to the centers.

If the distances between the points of suspension on the individual oscillating bodies 21, 22, 23 and 24 are denoted by $L_1$, $L_2$, $L_3$, $L_4$ and the entire length of each oscillator is L, the following equation exists for the coupling coefficient between two succeeding bodies $i$ and $k$ for cases where $i$ and $k$ equal 1, 2, 3 or 4:

$$(1) \quad K_{ik} = K_o \cdot \sin \frac{\pi}{2}\left(2\frac{L_i}{L}-1\right) \cdot \sin \frac{\pi}{2}\left(2\frac{L_k}{L}-1\right)$$

wherein $K_o$ is the maximum coupling coefficient obtainable in cases where the coupling wires are welded to the ends of the cylinder. This coupling coefficient is substantially dependent upon the ratio of the diameter of the oscillating bodies and the coupling wires, as well as upon the materials thereof.

The embodiment according to FIG. 4 relates to a system comprising four coupling wires which are each secured to the oscillating bodies symmetrically with respect to the nodes of each oscillating body. However, the invention is applicable for any other number of coupling wires. It is not necessary that the wires be symmetrically attached to the oscillating bodies. Assuming $n$ is the number of coupling wires secured to the individual oscillating bodies at different distances from the node points, the coupling coefficient $K_{ik}$ of two succeeding oscillating bodies, identified by the subscripts $i$, $k$, is:

$$(2) \quad K_{ik} = K_o \sum_{j=1}^{n} \sin \frac{\pi}{2}\left(2\frac{L_{ij}}{L}-1\right) \cdot \sin \frac{\pi}{2}\left(2\frac{L_{kj}}{L}-1\right)$$

wherein $j$ is a constant depending upon the particular coupling wire.

FIG. 5 illustrates an embodiment for such a type of coupling in a filter having two coupling wires. In contrast to the embodiment of FIG. 4, the coupling wires 27′ and 28′ are attached to each oscillating body at different distances $L_{ij}/2$ from the oscillation node point, wherein the subscript $i$ denotes the oscillation body and the subscript $j$ the respective coupling wire. In this particular case the equation (2) has the following form:

$$(3) \quad K_{ik} = K_o \left( \sin \frac{\pi}{2}\left(2\frac{L_{i1}}{L}-1\right) \cdot \sin \frac{\pi}{2}\left(2\frac{L_{k1}}{L}-1\right) \right. $$
$$\left. + \sin \frac{\pi}{2}\left(2\frac{L_{i2}}{L}-1\right) \cdot \sin \frac{\pi}{2}\left(2\frac{L_{k2}}{L}-1\right) \right)$$

wherein $K_o$ is the maximum coupling coefficient obtainable with a single coupling wire.

FIG. 6 is a schematic showing of an embodiment, in which the coupling wires are secured to the end surfaces of the cylinders, only one of these surfaces of each cylinder being illustrated in this figure. The wires are fixed thereto at mutually different distances $D_1$, $D_2$, $D_3$, $D_4$ symmetrically with respect to the torsional axis. This illustration can be understood without further explanations in view of the foregoing. In this embodiment, as in FIG. 5, the coupling wires may be secured to the individual oscillating bodies nonsymmetrically with respect to the torsional axis.

I claim:

1. A mechanical filter comprising at least two spaced stationary blocks; at least two wires attached at their ends to the blocks and suspended in substantially parallel relation therebetween; a plurality of cylindrical resonator elements disposed with their axes in mutually parallel spaced relation and, at their respective ends, attached to and supported by said wires in a ladder-like structure with the centers of the axes of said resonator elements being symmetrically located with respect to said wires, the resonator elements each vibrating as a single unit torsionally about their respective axial centers and the wires vibrating in longitudinal modes substantially transversely of said axes.

2. A mechanical filter comprising a plurality of cylindrical resonator elements adapted to vibrate in a torsional mode, said cylindrical resonator elements being disposed with their axes in mutually spaced parallel relation; at least two coupling wires disposed across said cylindrical resonator elements in directions substantially normal to their axes and each wire being fastened to a respective end of each of the resonator elements to form a ladder-like structure, said wires constituting means for suspending said resonator elements in such a manner that each resonator element vibrates in a torsional mode as a single unit, said wires being oscillatory in a longitudinal mode wherein longitudinal oscillation of the wires corresponds with torsional oscillation of said resonator elements.

3. In a filter as set forth in claim 2, said coupling wires comprising four parallel wires fixed to the resonator elements at opposite sides of opposite ends and forming therewith parallelopipeds.

4. In a filter as set forth in claim 2, said resonator elements each having at least one vibrational node along its axis intermediate its ends and the amplitude of oscillation about its axis varying directly as the distance from a node; and said coupling wires being connected between points on adjacent resonator elements, the coefficient of coupling between two resonator elements being a function of the distances from the nodes at which the wire is connected to the resonator elements.

5. In a filter as set forth in claim 4, the distances of said nodes from said points at which the wires connect to said resonator elements being different on one resonator element than on another.

6. In a filter as set forth in claim 2, said resonator elements oscillating about their axes with an amplitude of oscillation varying directly as the distance from the axis, and said coupling wires being connected between points on the end faces of adjacent resonator elements, the coefficient of coupling between two resonator elements being a function of the radial distances from the axes of the points at which the wires are connected to said end faces.

7. In a filter as set forth in claim 6, the distances from said axes of said points at which said wires are connnected being different on one resonator element than on another.

References Cited in the file of this patent
UNITED STATES PATENTS

| | | |
|---|---|---|
| 1,933,306 | Berry et al. | Oct. 31, 1933 |
| 2,615,981 | Doelz | Oct. 28, 1952 |
| 2,736,824 | Roberts | Feb. 28, 1956 |
| 2,799,832 | Niederman et al. | July 16, 1957 |
| 2,810,888 | George et al. | Oct. 22, 1957 |
| 2,856,588 | Burns | Oct. 14, 1958 |